United States Patent
Jarvis et al.

(10) Patent No.: US 9,586,427 B2
(45) Date of Patent: Mar. 7, 2017

(54) LAMINATION OF AOM

(71) Applicant: Tetra Laval Holdings & Finance S.A., Pully (CH)

(72) Inventors: Anthony Jarvis, Cheshire (GB); Chris Wyres, Cheshire (GB); Ladislav Hurdalek, Lund (SE); Marcus Rehberger, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 14/368,923

(22) PCT Filed: Dec. 12, 2012

(86) PCT No.: PCT/EP2012/075200
§ 371 (c)(1),
(2) Date: Jun. 26, 2014

(87) PCT Pub. No.: WO2013/098075
PCT Pub. Date: Jul. 4, 2013

(65) Prior Publication Data
US 2014/0371063 A1    Dec. 18, 2014

(30) Foreign Application Priority Data

Dec. 30, 2011    (SE) ...................................... 1151299

(51) Int. Cl.
*B41M 7/00*    (2006.01)
*B41M 5/42*    (2006.01)
(Continued)

(52) U.S. Cl.
CPC ............... *B41M 5/42* (2013.01); *B32B 27/06* (2013.01); *B32B 27/32* (2013.01); *B41M 5/44* (2013.01);
(Continued)

(58) Field of Classification Search
CPC . B41M 5/26; B41M 5/32; B41M 5/44; B41M 7/00; B41M 7/0027; B41M 2205/40;
(Continued)

(56) References Cited

U.S. PATENT DOCUMENTS 8,048,608 B2 *  11/2011  Jarvis ..................... B41M 5/267
                                                   106/400
8,398,760 B2 *   3/2013  Jarvis ...................... B41M 5/26
                                                  106/31.32
(Continued)

FOREIGN PATENT DOCUMENTS

CN    101228034 A      7/2008
WO    WO-0201250 A2    1/2002
(Continued)

OTHER PUBLICATIONS

International Search Report issued Feb. 6, 2013 in International Application No. PCT/EP2012/075200 (3 pages).
(Continued)

*Primary Examiner* — Bruce H Hess
(74) *Attorney, Agent, or Firm* — Finnegan, Henderson, Farabow, Garrett & Dunner LLP

(57) ABSTRACT

A substrate coated with a markable ink formulation, comprising AOM. Further, the substrate is covered by a thermoplastic polymer layer, such that the ink formulation is situated between the substrate and the thermoplastic polymer layer and/or in the thermoplastic polymer layer.

25 Claims, 1 Drawing Sheet

(51) Int. Cl.
*B32B 27/06* (2006.01)
*B32B 27/32* (2006.01)
*B41M 5/44* (2006.01)
*B65D 30/08* (2006.01)
*B65D 85/72* (2006.01)

(52) U.S. Cl.
CPC ........... *B41M 7/0027* (2013.01); *B65D 31/02* (2013.01); *B65D 85/72* (2013.01); *B32B 2255/00* (2013.01); *B32B 2307/75* (2013.01); *B32B 2439/70* (2013.01); *B41M 2205/40* (2013.01)

(58) Field of Classification Search
CPC .... B41M 5/327; B41M 5/3275; B41M 5/333; B41M 5/3333; B41M 5/37; B41M 5/3337
USPC .......... 503/200–226, 150, 152; 427/150–152
See application file for complete search history.

(56) References Cited

U.S. PATENT DOCUMENTS

| | | |
|---|---|---|
| 2010/0015558 A1 | 1/2010 | Jarvis et al. |
| 2011/0148092 A1 | 6/2011 | Jarvis et al. |
| 2011/0151380 A1 | 6/2011 | Jarvis et al. |
| 2011/0159268 A1 | 6/2011 | Jarvis |
| 2012/0142527 A1* | 6/2012 | Smyth .................. G01N 31/225 503/201 |

FOREIGN PATENT DOCUMENTS

| | | |
|---|---|---|
| WO | 2004043704 A1 | 5/2004 |
| WO | WO-2005012442 A1 | 2/2005 |
| WO | WO-2005068207 A1 | 7/2005 |
| WO | WO-2007012578 A1 | 2/2007 |
| WO | WO-2004043704 A1 | 5/2007 |
| WO | WO-2007141522 A1 | 12/2007 |
| WO | WO-2008050153 A1 | 5/2008 |
| WO | 2010001171 A1 | 1/2010 |
| WO | WO-2010001171 A1 | 1/2010 |
| WO | WO-2010/029276 A1 | 3/2010 |
| WO | WO-2010112940 A1 | 10/2010 |
| WO | 2012114121 A2 | 8/2012 |
| WO | WO-2012114121 A2 | 8/2012 |

OTHER PUBLICATIONS

International-Type Search Report issued May 29, 2012 in Sweden Application No. 1151299-3 including English translation (10 pages).

Office Action mailed on May 27, 2015, in counterpart China Application No. 201280057793.X, by the State Intellectual Property Office of the People's Republic of China and English-language translation (15 Pages).

* cited by examiner

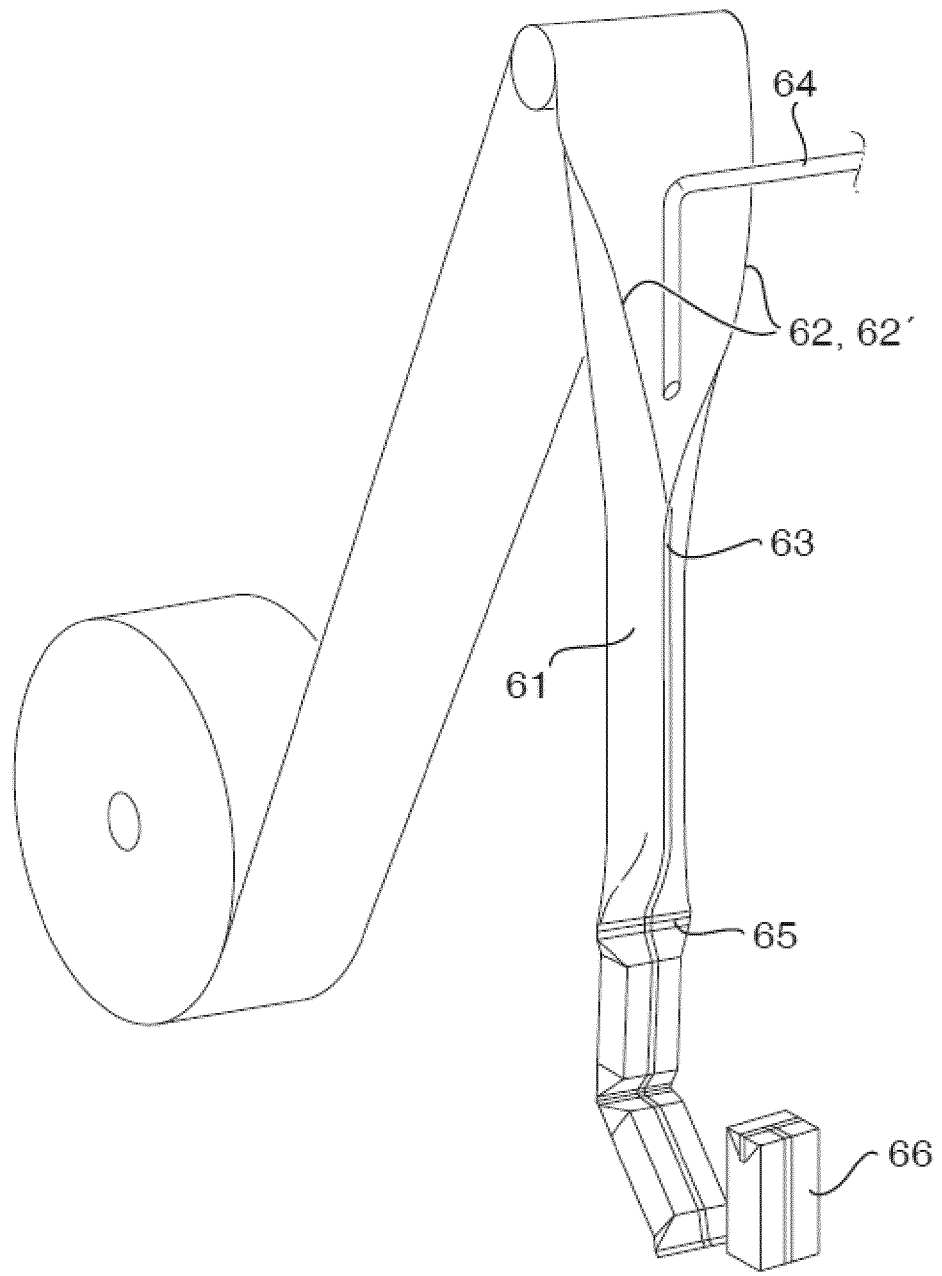

LAMINATION OF AOM

CROSS REFERENCE TO RELATED APPLICATIONS

This is a U.S. National Phase Application of International Application No. PCT/EP2012/075200, filed Dec. 12, 2012, which claims the benefit of priority to Sweden Patent Application No. 1151299-3; filed Dec. 30, 2011, all of which are incorporated herein by reference.

FIELD OF THE INVENTION

The present invention relates to a markable substrate coated with an ink formulation, the ink formulation being covered by a thermoplastic polymer layer in a manner such that the ink formulation is situated between the substrate and the thermoplastic polymer layer and/or in the thermoplastic polymer layer, whereby the ink formulation is protected. Further, the present invention relates to a method for obtaining such a markable substrate and a method for marking, e.g. printing, the substrate.

BACKGROUND

Various proposals have been made in the art for achieving effective marking of substrate, by causing a change of color in or on the substrate, on which the marking, image or print is to appear. In the art, various irreversible thermochromic marking components, i.e. activatable pigments, are disclosed. Substrates coated with such irreversible thermochromic marking components may be colored by application of heat, such as by lasers; thereby the coated substrate may be marked. Marking of a substrate with a laser or some other irradiation source, may be also denoted printing or imaging, as the laser and/or the substrate typically is moved during the process of marking the substrate.

As an example, WO 02/01250 discloses the use of various oxymetal salts, such as ammonium octamolybdate (AOM), as marking component in laser marking. AOM is an example of a marking component that may be marked directly with 10,600 nm laser radiation. Laser radiation having a wavelength of about 10 μm may for example be obtained by use of mid-IR $CO_2$ lasers with an emission wavelength in the range 10,000 nm to 12,000 nm. However, mid-IR $CO_2$ lasers are less suitable for installation into existing production lines due to their physical bulk size. Thus, mid-IR $CO_2$ lasers are less suited for marking of substrates to be marked in a existing production line, such as a production line for liquid food packages.

An NIR fiber laser may have a small print-head fitted to the production line, being connected to the laser, several meters away, via an umbilical cord. Thus, the disadvantage or mid-IR $CO_2$ lasers, being less suitable for installation into existing production lines due to their physical bulk size, may be overcome by use of a NIR (near infra-red) laser and by addition of a NIR-absorber to the ink formulation. The NIR-absorber will absorb near infra-red laser irradiation and convert it into conductive heat. Thus, ink formulations comprising a marking component, e.g. AOM, and a NIR-absorber may be marked by use of a NIR-laser instead of a mid-IR laser. A common example of a NIR-laser is Nd:YAG laser.

Leuco dyes are another type of marking components. They are colorless in one form, but may change into a colored form upon exposure to a particular stimulus. Most leuco dyes are halochromic, i.e. they respond to changes in pH, typically being colorless under alkaline conditions, but being colored in an acidic environment. The color change of halochromic leuco dye may occur when the leuco dye is protonated. Such protonation may result in changes in the conjugate systems of the leuco dye, thereby a conjugated system may be form, having ability to absorb photons of visible light, and therefore appearing colored.

By combining a halochromic leuco dye and a thermal acid generator (TAG) releasing protons upon heating, also halochromic leuco dye may be used in thermal printing, such as in laser printing. A well known and effective TAG is benzylhydroxybenzoate, which in combination with various halochromic leuco dyes, provides ink formulation having god printability.

Charrables are another type of marking components. A charrable is a substance that upon heating undergoes a charring reaction to yield contrasting dark brown/black colour. Typically charrable compounds comprise carbon, hydrogen and oxygen and upon heating undergo a series of reactions that result in the loss of hydrogen and oxygen. Examples of charrable compounds include amino acids, carbohydrates and saccharides. Typical charrable compounds are sugars and polysugars, such as glucose, maltodextrin and saccharose. Commonly, the charrable agent is used in combination with an acidic or basic compound, such as acidic or basic salt. Examples include ammonium salts such as ammonium phosphates and sodium carbonate and sodium bicarbonate. Laser marking based on charring reactions usually require a fairly high fluence >4 $J/cm^2$ in order to mark with sufficient contrasting color. Further, use of charrable compounds are especially interesting for use in applications in connection with food stuff, as charrables such as glucose, maltodextrin and saccharose, are non-toxic and often used already present in food stuff.

In certain applications there is a need for covering the substrate with a thermoplastic polymer layer. By covering the substrate with a thermoplastic polymer layer, certain properties of the substrate, such as the impermeability to liquids, are improved. Further, a thermoplastic polymer layer may also be used to protect an underlying print. For packaging material, typically being a laminate including at least one layer of paper, cardboard, corrugated paper board, or paper board, the outermost layer, or one of the outer layers covering, the substrate is typically low-density polyethylene (LDPE)) or polypropylene melt extruded onto the laminate. For such polyolefins, a temperature of 200 to 340° C. is typically used in melt extruding the polyolefin.

As already described, marking components in the art are typically thermo activated. Typically, discoloration is thus seen, due to activation of the marking component, if such marking components are over laminated by melt extrusion. Accordingly, heat activated marking components are thus presently coated on top of the outermost layer of packaging material laminate, as said layer typically is a melt extruded polyolefin layer, in order to avoid discoloration prior to printing. However, also such materials suffers from disadvantages, as the marking of such coating by applying heat, typically by laser irradiation, may damage the thermoplastic polymer layer.

In order to protect the ink formulation, it would be desirable to have a markable ink formulation less prone to discoloration during over lamination by melt extrusion. Further, it would be desirable to be able to mark a substrate having an ink formulation covered by a thermoplastic polymer without damaging the thermoplastic polymer layer.

SUMMARY

Consequently, the present invention seeks to mitigate, alleviate, eliminate or circumvent one or more of the aboveidentified deficiencies in the art and disadvantages singly or in any combination by providing a substrate coated with an ink formulation, which ink formulation comprises a salt of a transition metal oxyanion, wherein said substrate is covered by a thermoplastic polymer layer in a manner such that the ink formulation is situated between the substrate and the thermoplastic polymer layer and/or in the thermoplastic polymer layer.

A further aspect of the invention relates to a liquid food packaging material. The liquid food packaging material comprises an innermost polyolefin layer to be in contact with the liquid food, such a substrate as described herein, and a barrier layer, such as an oxygen barrier layer arranged between the innermost polyolefin layer and the substrate. The thermoplastic polymer layer is the outermost layer of the liquid food packaging material. An additional aspect, the invention relates to a liquid food package comprising such a liquid food packaging material.

A further aspect of the invention relates to a method for obtaining such a substrate. Such a method comprises the steps of:
  providing a substrate;
  coating said substrate with such an ink formulation as described herein above; and
  covering said coated substrate with a thermoplastic polymer layer in a manner such that the ink formulation becomes situated between the substrate and the thermoplastic polymer layer and/or in the thermoplastic polymer layer.

A further aspect of the invention relates to a method for marking such a substrate as described herein above. Such a method comprises the steps of:
  irradiating those parts of the coated substrate, where a marking is intended, in order to generate a marking.

Further advantageous features of the invention are defined in the dependent claims. In addition, advantageous features of the invention are elaborated in embodiments disclosed herein.

DETAILED SUMMARY OF PREFERRED EMBODIMENTS

Benzylhydroxybenzoate is a traditional TAG from the thermal paper industry. It has been found that this well known and effective TAG when used in combination with various halochromic leuco dyes, such as ETAC, provides ink formulations with god printability. However, attempts to cover such ink formulations with a thermoplastic polymer layer, by melt extrusion of a polyolefin, such as low-density polyethylene (LDPE), at about 300° C., resulted in activation of the TAG, whereby the substrate was significantly discolored.

Furthermore, attempts to use charrable type of ink formulation did provide an ink formulation, which could be covered by a thermoplastic polymer layer without discoloring the substrate to any extent. However, any attempt to mark such a covered ink formulation with a laser, resulted in disruption of the thermoplastic polymer layer.

However, it was unexpectedly found that ammonium octamolybdate (AOM; $(NH_4)_4 \cdot Mo_8O_{26}$) may be used to obtain ink formulations, which only are discolored to a low extent during coverage by melt extrusion of a polyolefin, such as low-density polyethylene (LDPE), at about 300° C. As AOM is taught to be activated at temperatures exceeding 200° C. (cf. M A. Eikoh (May 1964) "*The Thermal Decomposition of Ammonium Polymolybdates. II*" Bulletin of the Chemical Society of Japan 37(5):648-653), the finding is indeed surprising. It should be noted that, although LDPE in principle may be extruded at such a low temperature as about 200° C., extrusion at such a low temperature results in inferior adhesion to the substrate onto which the polyolefin is extruded.

Further, it was surprisingly found that such ink formulations anyhow may be efficiently activated to mark the substrate without disrupting the thermoplastic polymer layer covering the ink formulation. Exposure to temperatures exceeding 340° C. would normally degrade LDPE.

Such ink formulations are therefore well suited for use in substrates, such as packing materials, which substrates have an outermost layer being a thermoplastic polymer layer.

An embodiment thus relates to a substrate coated with an ink formulation comprising AOM, wherein said substrate is covered by a thermoplastic polymer layer in a manner such that the ink formulation is situated between the substrate and the thermoplastic polymer layer and/or in the thermoplastic polymer layer.

AOM belongs to a class of transition metal oxyanion salts a being markable upon heat activation. A further embodiment, thus relates to a substrate coated with an ink formulation comprising a salt of a transition metal oxyanion, wherein said substrate is covered by a thermoplastic polymer layer in a manner such that the ink formulation is situated between the substrate and the thermoplastic polymer layer and/or in the thermoplastic polymer layer. Preferably, the transition metal oxyanion salt is salt comprising:
  a transition metal oxyanion of formula $A_xO_y^{z-}$, wherein "x" is an integer of 1 to 18, such as being 7 or 8; "y" is an integer of 4 to 42, such as being 24 or 26; "z" is an integer of 1 to 12, such as being 4 or 6; and "A" is a transition metal selected from the group consisting of Mo (molybdenum), Cr (chromium), W (tungsten), and Va (vanadium); preferably "A" is Mo (molybdenum); and
  at least one, such as 1, 2, 3, or 4, counterions, each counterion independently being selected from the group consisting of unsubstituted ammonium cation(s), i.e. $NH_4^+$; protonated primary, secondary and tertiary alkylamines; and substituted ammonium cation(s), comprising a nitrogen atom and at least one further group selected from the group consisting of OH, COOH, NH2, $NHC_{1-5}$ alkyl, and $N(C_{1-5}$ alkyl$)_2$, wherein the two $C_{1-5}$ alkyl may be the same type of alkyl or different alkyls.

According to an embodiment, the counterion(s) is/are independently selected from unsubstituted ammonium cation(s), i.e. $NH_4^+$, and protonated primary, secondary and tertiary alkylamines. According to such an embodiment, the counterion(s) is/are ammonium cation(s), i.e. $NH_4^+$.

Example of primary alkylamines include methylamine, cyclohexylamine, and 2-ethylhexylamine. According to an embodiment, protonated primary alkylamines, are amines according to the following formula $HNH_2C_{1-12}alkyl^+$, such as $HNH_2C_{1-5}alkyl^+$, wherein alkyl denotes a linear or branched hydrocarbon radical.

Examples of secondary alkylamines include dimethylamine. According to an embodiment, protonated secondary alkylamines, are amines according to the following formula $HNH(C_{1-12}alkyl)_2^+$, such as $HNH(C_{1-5}alkyl)_2^+$, wherein the alkyl denotes linear or branched hydrocarbon radical. In such protonated secondary alkylamine, the two $C_{1-12}$alkyl groups or the two $C_{1-5}$alkyl groups may be the same or different.

Examples of tertiary alkylamines include triethylamine. According to an embodiment, protonated tertiary alkylamines, are amines according to the following formula $HN(C_{1-12}alkyl)_3^+$, such as $HH(C_{1-5}alkyl)_3^+$, wherein alkyl denotes linear or branched hydrocarbon radical. In such protonated tertiary alkylamine, the three $C_{1-12}$alkyl groups, or the three $C_{1-5}$alkyl groups, may be the same or different. Further, two $C_{1-12}$alkyl groups, or two $C_{1-5}$alkyl groups, may be the same, and the third one different.

Although, other transition metals than molybdenum also may provide heat driven marking properties, it is preferred if the transition metal oxyanion is a molybdenum oxyanion. Especially, the molybdenum oxyanion may be a molybdate (VI) anion, such as a heptamolybdate anion ($Mo_7O_{24}^{-6}$) or an octamolybdate anion ($Mo_8O_{26}^{-4}$). Most preferred, the molybdate (VI) anion is an octamolybdate anion ($Mo_8O_{26}^{-4}$).

According to another embodiment, at least one counterion is selected from substituted ammonium cations, comprising a nitrogen atom and at least one further group selected from the group consisting of OH, COOH, NH2, $NHC_{1-5}$ alkyl, and $N(C_{1-5}$ alkyl$)_2$, wherein the two $C_{1-5}$ alkyl may be the same type of alkyl or different alkyls. Inclusion of such a counterion will improve the aqueous solubility of the transition metal oxyanion salt. According the another embodiment, the number of $NH_4^+$ cations and protonated primary, secondary, and tertiary alkyl amines, does not exceed the number of substituted ammonium cations comprising at least one group selected from the group consisting of OH, COOH, NH2, $NHC_{1-5}$ alkyl, $N(C_{1-5}$ alkyl$)_2$, wherein the two $C_{1-5}$ alkyl may be the same type of alkyl or different alkyls.

It is to be noted that substituted ammonium cations, wherein the further group is selected from the group consisting of NH2, $NHC_{1-5}$ alkyl, and $N(C_{1-5}$ alkyl$)_2$, will comprise at least two nitrogen atoms.

According to an embodiment, the substituted ammonium cation comprising at least one group selected from the group consisting of OH, COOH, NH2, $NHC_{1-5}$ alkyl, $N(C_{1-5}$ alkyl$)_2$, wherein the two $C_{1-5}$ alkyl may be the type of alkyl or different, is an alcohol-amine, an amino-sugar, or an amino-acid.

Alcohol-amines are compounds that comprise at least one amino group and at least one hydroxyl group, such as hydroxylamine, monoethanolamine, diethanolamine, triethanolamine. Preferred alcohol-amines may be represented by the general formula (I),

$HNR_1R_2R_3^+$ general formula (I)

wherein $R_1$ is $C_{2-5}$ alkyleneOH; and
each $R_2$ and $R_3$ is independently selected from the group consisting of $C_{2-5}$ alkyleneOH, hydrogen, and $C_{1-5}$ alkyl. An especially preferred example of an alcohol-amine is triethanolamine, i.e. $N(CH_2CH_2OH)_3$.

Amino-sugars, which are sugars, i.e. sacharides, e.g. mono-sacharides, in which one or more of the non-glycosidic hydroxyl groups has been replaced by an amino group. Preferred examples of amino-sugars include D-glucosamine and galactosamine.

Amino-acids are organic compounds that comprise at least one amino group and at least one carboxyl group. Preferred examples of amino-acids include: glycine and any other known amino acid.

Further, substituted ammonium cation comprising at least one group selected from the group consisting of OH, COOH, $NH_2$, $NHC_{1-5}$ alkyl, $N(C_{1-5}$ alkyl$)_2$, wherein the two $C_{1-5}$ alkyl may be the type of alkyl or different, may also comprise additional ionic group(s). Examples of such groups comprise quaternary nitrogen groups, sulphonate groups and carboxylate groups.

In an alternative less preferred embodiment, the substituted ammonium cations comprising at least one group selected from the group consisting of OH, COOH, $NH_2$, $NHC_{1-5}$ alkyl, $N(C_{1-5}$ alkyl$)_2$, wherein the two $C_{1-5}$ alkyl may be the type of alkyl or different, also other amines, may be replaced by other types of water soluble amines, such as amino-ethers and amino-poly-ethers, e.g. amino-PEGs. Specific examples include 2-methoxyethylamine and similar amines.

A specific example of a readily water soluble marking compound is tetra-triethanolammonium octamolybdate $((HN(CH_2CH_2OH)_3)_4 * Mo_8O_{26})$ or other molybdates obtainable by reacting molybdenum (VI) oxide with triethanolamine. A method for obtaining transition metal oxyanion salts comprising a molybdate and triethanolammonium is provided below.

In such a method, molybdenum (VI) oxide and triethanolamine is added to a slightly acidic aqueous solution of ammonium chloride (pH about 5). It is not necessary to ad the ammonium chloride before the other additives. The aqueous solution, to which molybdenum (VI) oxide and triethanolamine is added, is slightly heated to a temperature of 30-40° C. Subsequently to the addition, the temperature is raised to 85 to 100° C. After the 1 to 5 hours, the temperature is lowered to 35 to 45° C. and the mixture is added to an excess (volume vs. volume) of isopropylalcohol. After thoroughly stirring of the mixture at about 35 to 45° C., it is left unstirred at room temperature, such as about 20° C., to allow for precipitation of crystals of a compound comprising a molybdate anion and triethanolammonium. In order to promote formation of crystals, the mixture may be cooled to 0 to 10° C. Subsequent to crystallization, the solvent is removed by filtration. The crystals are then dried under vacuo at slightly elevated temperature, i.e. 40 to 50° C. Further, in EP 0 015 496, a procedure for obtaining amino molybdates is also described.

According to an embodiment, alkyl, as used herein, is intended to mean a straight or branched saturated hydrocarbon radical. According to an embodiment, carboxy, as used herein, is intended to mean a —COOH or a —COO⁻ group. According to an embodiment, "alkylenyl" or "alkylene", as used herein, alone or as a suffix or prefix, is intended to mean a straight chain saturated aliphatic hydrocarbon groups; the groups linked by an alkylene or alkylenyl-group are intended to be attached to the first and to the last carbon of the alkylene or alkylenyl-group. In the case of methylene, the first and the last carbon is the same. As used herein, the integers "x1" and "x2" in "$C_{x1-x2}$ refer to the number of carbon atoms in the relevant group, i.e. the group contains from "x1" to "x2" carbon atoms. For example a "$C_{1-4}$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—. Examples of $C_{1-4}$-alkyl are methyl, ethyl, propyl, isopropyl, butyl, sec-butyl, isobutyl and tert-butyl. For example a "$C_{1-3}$ alkylene" group refers to all alkyl groups having from 1 to 3 carbons, i.e. methylene, ethylene, propylene, and 1-methylethylene.

In the ink formulation disclosed herein, various amounts of salts of transition metal oxyanion, such as AOM, may be used. The ink formulation may comprise 5 to 75 wt. %, such as 10 to 60 wt. %, of a salt of a transition metal oxyanion, such as AOM.

As use of NIR-lasers for activating the ink formulation are advantageous in certain applications, such as installation into existing production lines, the ink formulation may, according to an embodiment, further comprise a near infra red absorber. The ink formulation may comprise 0.1 to 10%, such as 0.25 to 5 wt. %, of a near infra red absorber.

Various types of NIR-absorbers are known within the art and examples of such comprise:

Organic dye/pigment types. Examples of such NIR-absorbers are for example disclosed in U.S. Pat. No. 6,911,262 and WO 2008/050153;

Stoichiometric inorganic pigment types, such as Copper salts, e.g. copper (II) hydroxyl phosphate. Examples of this type of NIR-absorbers are disclosed in WO 2005/068207; and Conductive polymers. Conductive polymers are materials that, in the polymerized state, comprise linked monomers (typically rings) that are conjugated and which can therefore allow delocalisation/conduction of positive or negative charge. Examples his type of NIR-absorbers are disclosed in WO 2005/012442

Further examples of NIR-absorbers are disclosed in WO 2005/012442, WO 2005/068207, WO 2007/141522 and WO 2008/050153.

A preferred type of NIR-absorber is disclosed in WO 2007/141522. In said publication various types of non-stoichiometric inorganic pigment types are disclosed. Non-stoichiometric refers to the fact that the ratio of elements in the compound may not be represented by integers. A preferred example of non-stoichiometric inorganic NIR-absorber is reduced indium tin oxide (r-ITO).

According to an embodiment, the ink formulation comprises reduced indium tin oxide, typically in the form of a nanopowder. Reduced indium tin oxide is a non-stoichiometric compound, comprising indium oxide doped with tin oxide, which doped indium oxide has been reduced. Reduction of indium tin oxide removes of oxygen, thus leaving an excess of indium and/or tin in the zero oxidation state, i.e. metallic indium and/or tin. Without being bond to any theory, it is believed to create a free electron that is free to migrate through the solid lattice. This free electron bestows electrical conductivity properties and, in the case of r-ITO NIR absorption properties.

According to an embodiment, the reduced indium tin oxide (r-ITO) in the ink formulation is r-ITO in powder form exhibiting a lightness (L*), according to the 1976 CIE (L*, a*, b*) space, of not more than 50. Preferably, the r-ITO in powder form exhibits a lightness (L*), according to the 1976 CIE (L*, a*, b*) space, of at least 20.

The 1976 CIE (L*, a*, b*) space, is a color model adopted in 1976 by CIE (Commision Internationale de lÉclairage; or in English The International Commission on Illumination). It is an opponent color system based on an earlier system of Richard Hunter, which was called L, a, b. Color opposition correlates with discoveries in the mid-1960s, indicating that somewhere between the optical nerve and the brain, retinal color stimuli are translated into distinctions between light and dark, red and green, and blue and yellow. In the 1976 CIE (L* a*, b*) space color model, this is indicated by the values on three axes: L*, a*, and b*. The central vertical axis represents lightness (signified as L*) and its runs from 0 (black) to 100 (white). The color axes are based on the fact that a color can not be both red and green, or both blue and yellow, because these colors oppose each other. On each axis the values run from positive to negative, and on the a-axis, positive values indicate amounts of red while negative values indicate amounts of green. On the b-axis, positive values indicate amounts of yellow, while negative values indicate amounts of blue. For both axes, zero is neutral gray. As the 1976 CIE (L*, a*, b*) space is device independent, it has become very important and is used for color management. As an example, the 1976 CIE (L*, a*, b*) space is used as a device independent model of the ICC (International Color Consortium).

r-ITO is typically blue and does thus typically display negative a-values. When used in printing applications it should, in powder form, preferably have a lightness (L*) of not more than 50, as indicated above. Preferably, r-ITO for use in printing applications as disclosed herein should thus be dark, such as dark blue.

The lightness (L*) of a sample of r-ITO may be determined by colometry. As an example a SpectroEye spectrophotometer/densitometer from GretagMacbeth may be used. For determining the lightness (L*) of a sample of r-ITO, a powder cell may be used. Further, the following settings may be used: Illumination type: D65; and Standard Observer: 2°.

However, as indicated above, the 1976 CIE (L*, a*, b*) space is a device independent color model, thus also other spectrophotometers may be used to determine the color of a sample of r-ITO.

According to an embodiment, more than 0 molar %, such as at least 25 molar % or at least 50 molar %, of the tin in the reduced indium tin oxide (r-ITO), may be tin in the zero oxidation state. Further, less than 100 molar %, such as not more than 75 molar %, of the tin in the reduced indium tin oxide (r-ITO), may be tin in the zero oxidation state. In addition, more than 0 molar %, such as at least 5 molar %, but not more than 25 molar %, or at least 5 molar %, but not more than 15 molar %, of the indium in said reduced indium tin oxide (r-ITO), may be indium in the zero oxidation state.

While the lightness may be related to the degree of reduction, also other parameters, e.g. stoichiometry, particle size, contaminations, etc., may affect the lightness of r-ITO. It has been found that the lightness (L*) is a parameter being indicative for the printability of ink formulations comprising NIR-absorbers.

The reduced indium tin oxide is typically present in the form of particles, i.e. as a powder. Particles of reduced indium tin oxide may have a median particle size in the range from 10 nm to 10 μm. Further, the particles may be nanoparticles and the median particle size may accordingly be less than 1 μm, such as less than 250 nm. Nanoparticles may have a median particle size of at least 10 nm. Decreasing the particle size will enhance the NIR-absorbing properties.

According to an embodiment, the median particle size is determined in accordance with ISO Standard 9276-2 or 9276-5. Further, the particles may have a volume based particle size of 10 nm to 10 μm, such as less than 1 μm or even less than 250 nm. The volume based particle size may be at least 10 nm.

It will be appreciated by one of ordinary skill in the art that it is possible to incorporate additives of various sorts in the ink formulation, and which might be beneficial in certain circumstances. Such additives include, for example, polymer binders, mild reducing agents to promote thermal printer performance, colorants such as dyes or pigments, light stabilizing agents such as UV-absorbers and hindered amine light stabilizers (HALS), antioxidants and other known stabilisers, pH buffers, acid and base scavengers, antiblocking materials such as talc or selected silicas, and materials adsorbent to or reactive with any thermolysis products of laser imaging, surfactants, adhesion promoters, dispersing aids, inks flow/rheology modifiers, humectants, slow drying solvents, fast drying solvents, biocides and the like.

The ink formulation may also comprise further additives. Typically the ink formulation will comprise a binder. The binder may be one or more of a range of water-soluble or amine-stabilized aqueous emulsion polymers suitable for use in water-based coating or ink formulations. As an example, acrylic polymers may be used. Further, the ink formulation may comprise pigments, such as water-dispersible inorganic or organic additives such as calcium carbonate etc. The ink formulation may also comprise one or more of a range of additives, including surfactants or lubricants, such as zinc stearate. Further, the ink formulation may comprise antifoaming agents, such as mineral oil based antifoaming agent. The ink formulation may also comprise dispersing agents and/or film forming modifiers. Further, the ink formulation may comprise light stabilising agents, such as UV absorbers and hindered amines, ink flow/rheology modifiers, drying rate modifiers, such as slow solvents, e.g. diethylene glycol, and plasticisers, and/or adhesion promoters, such as titanate compounds.

According to an embodiment, the ink formulation is water-based, i.e. the ink formulation comprises water. As an example, the composition may comprise 5 to 95 wt. % such as 10 to 50 wt. %, of an aqueous-based solvent. The aqueous-based solvent may comprise at least 10 wt % water, preferably at least 50 wt %, such as at lest 75 wt %, or at least 95 wt %, water.

Water based formulations has the advantage of being less unhealthy than formulations comprising volatile solvents. An aqueous based ink formulation may further comprise water-miscible organic solvents, such as $C_{1-4}$-alkanols, $C_{2-4}$-polyols, $C_{3-6}$-ketones, $C_{4-6}$-ethers, $C_{2-3}$-nitriles, nitromethane, dimethylsulfoxide, dimethylformamide, dimethylacetamide, methyl pyrolidone and sulfolane, whereby $C_{1-4}$-alkanols and $C_{2-4}$-polyols may be substituted with $C_{1-4}$-alkoxy groups.

Examples of $C_{1-4}$-alkanols are methanol, ethanol, propanol, isopropanol or butanol, isobutanol, sec-butanol and tert-butanol. Examples of a $C_{1-4}$-alkoxyderivatives thereof are 2-ethoxyethanol and 1-methoxy-2-propanol. Examples of $C_{2-4}$-polyols are glycol and glycerol. Examples of $C_{3-6}$-ketones are acetone and methyl ethyl ketone. Examples of $C_{4-6}$-ethers are dimethoxyethane, diisopropylethyl and tetrahydrofurane. An example of a $C_{2-3}$-nitrile is acetonitrile. Preferably, the water-miscible organic solvent is selected from the group consisting of $C_{1-4}$-alkanols, $C_{2-4}$-polyols, $C_{3-6}$-ketones, dimethylformamide and dimethylacetamide, whereby $C_{1-4}$-alkanols and $C_{2-4}$-polyols may be substituted with $C_{1-4}$-alkoxy groups.

The polymer covering the substrate is typically a transparent, clear polymer. Typically the polymer is a polyolefin, such as polyethylene (e.g. low-density polyethylene (LDPE)) or polypropylene. The thickness of the thermoplastic polymer layer may be 10 to 60 µm, such as 12 to 50 µm, or 15 to 40 µm. As an example, the thermoplastic polymer layer may be applied to the substrate by melt extrusion. For polyolefins, the temperature of the polymer melt in such melt extrusion may be between 200 and 340° C., such as between 280 and 330° C. While it may be preferred to use a lower temperature for the melt extrusion to reduce discoloration resulting from activation of AOM, the temperature should preferably be sufficiently high to provide good adhesion of the thermoplastic polymer layer to the substrate. Accordingly, use of the herein disclosed ink formulations is advantageous, as they may be covered with a thermoplastic polymer layer at about 300° C. without extensive discoloration, to provide good adhesion of the thermoplastic polymer layer to the substrate.

Coverage of the substrate by the thermoplastic polymer, may also be accomplished by laminating a pre-made polymer film over the surface coated with the ink formulation.

Although, the ink formulation may be compounded into the polymer and co-extruded with the polymer, it is preferred to melt extrude the polymer over the substrate subsequent have being coated with the ink formulation. Even though the polymer is melt extruded over the ink formulation, the ink formulation may anyhow, at least to certain extent, end up in the thermoplastic polymer layer, once the later has solidified.

The ink formulation may be coated onto the substrate by flexographic printing. Various amount of the ink formulation may be applied. The coat weight will affect the printability as well as other parameters of the substrate, including the peeling resistance of the thermoplastic polymer layer. According to an embodiment, a dry coat weight of 0.5 to 20 g/m$^2$, such as 1.0 to 10 g/m$^2$, or 5 to 8 g/m$^2$, may be employed.

In one embodiment the ink formulation is coated onto one side of the substrate only. In one embodiment the side comprising the ink formulation will be on the exterior side, when being part of a packaging material for liquid food, not intended to being in contact with the liquid food.

The substrate may be of various kinds According to an embodiment, the substrate may be paper, cardboard, corrugated paper board, paper board, plastic film, ridgid plastic parts, textile, wood, metal, glass, or leather. Further, the substrate may be a laminate comprising layers of paper, cardboard, paper board, plastic film, and/or metal film. Further, when the ink formulation is coated on paper, cardboard, or paper board, the paper, cardboard, paper board may be clay coated.

As a specific example the substrate may be part of a packing material, such as liquid food packaging material. According to an embodiment, such a packing material comprises an innermost layer (optionally being a multi-layer film) of a polyolefin intended to be in contact with the product, such as liquid food. Between the substrate and the innermost layer, a barrier material is arranged. The thermoplastic polymer layer of the substrate is the outermost layer of the liquid food packaging material and whereby not intended to be in contact with the product. The barrier material may be a gas barrier such as an oxygen barrier; a water vapor barrier; light barrier or odour barrier. An example of a barrier material is an aluminium foil or a film containing a metal vapour deposited layer. Other barrier materials are ethylene vinylalcohol copolymer (EvOH) and polyamide (PA). Optionally an adhesive layer in order to promote the adhesion is used between for example the barrier layer and the innermost layer. The substrate is selected from paper, cardboard, corrugated paper board, paper board, plastic film, such as a multi-layer film, ridged plastic parts, textile, wood, metal, glass, or leather. Optionally a bonding layer is arranged between the substrate and the barrier material. The substrate normally has a print and is covered by an outer thermoplastic polymer layer, e.g. LDPE or blends thereof.

The innermost layer may be a low density polyethylene selected from LDPE, LLDPE, mLLDPE and VLDPE or blends thereof. The innermost layer is possible to heat seal. Independently of each other the adhesive layer and the bonding layer may be an ethylene acrylic acid copolymer (EAA), ethylene methacrylic acid copolymer or an LDPE.

A further embodiment relates to a liquid food package comprising such a food packaging material described herein above. The liquid food package may be obtained by a roll fed system where the packaging material is fed the filling machine. FIG. 1 schematically illustrates a roll fed filling machine where the packaging material is sterilized, folded into a tube (61) and longitudinally sealed (63). The longitudinally sealed tube is filled with product (64) before being transversally sealed (65). The sealing may be done by induction sealing or ultrasonic sealing. The sealed package is thereafter cut and finally folded into a package (66). Alternatively the packaging material may be pre-cut before used in the filling machine. Pre-cut packaging material is normally referred to as blanks and has been used for example in manufacturing of packages of gable top type.

In connection with filling the liquid food package with a liquid food and sealing the package, information may be printed on the substrate via activation of the ink formulation. The sterilization of the packaging material is conventionally done by hydrogen peroxide and/or by radiation, such as UV or EB radiation. As the ink formulation is covered by thermoplastic polymer layer, it is protected during the steps in the filling machine where the ink otherwise could be compromised, for example by discoloration.

According to an embodiment the ink formulation is coated on a substrate having an outermost surface of paper, optionally being clay coated.

According to another embodiment the ink formulation is coated on a substrate having an outermost plastic surface, such as a substrate forming part of a ridged plastic part, a substrate being a plastic film, or the substrate being a laminate, wherein the outermost layer is a plastic layer.

A further embodiment relates to a method of obtaining such a substrate as disclosed herein. In such a method, the substrate is coated with the ink formulation. Subsequently, the coated substrate is covered with a thermoplastic polymer layer in a manner such that the ink formulation becomes situated between the substrate and the thermoplastic polymer layer and/or in the thermoplastic polymer layer. Aspects of the coating as well as the covering have been provided herein above.

A further embodiment relates to method for marking such a substrate as disclosed herein. In such a method those parts of the coated substrate covered by a thermoplastic polymer layer, where a marking is intended, are irradiated in order to generate a marking.

According to an embodiment, only parts of the coating are irradiated whereby a marking with a defined pattern may be obtained. Typically, although not necessary, at least part of the substrate is provided with a flat coating in such an embodiment. Upon irradiating such a flat coating, a marking will appear where the coating is irradiated. By only irradiating parts of the flat coating a marking with a defined pattern may be obtained. Figuratively speaking, this may be seen as writing, or etching, with a laser beam in the coating.

According to another embodiment, the ink formulation is coated in a defined pattern. In marking such a coated substrate, the entire coating, or at least part of the defined pattern, is irradiated in order to generate a marking. Figuratively speaking, this may be seen as developing a coated pattern in order to obtain a marking.

In order to allow for rapid and precise marking, the substrate is typically irradiated by a laser. In addition to lasers, also diodes, fiber coupled diode array systems or diode array systems may be used to generate a marking. As an example, diode array systems, which may emit both coherent and non-coherent light, may be used, as they are particularly suitable for use in high speed continuous or 'on the fly' imaging.

While others wavelength, such as wavelengths of about 10 μm, may be used as well, it is preferred if the irradiation source, e.g. the laser or the diode array system, has an operating in the wavelength range of 700 to 2500 nm. Examples of lasers having an operating in the wavelength range of 700 to 2500 nm are Nd:YAG lasers and NIR fiber lasers.

According to one embodiment, wherein the substrate is part of a liquid food package, the substrate is marked in connection with filling the liquid food package with a liquid food.

Another embodiment relates to a marked substrate. Such a marked substrate is obtainable as just described.

In marking of substrates, the color of the substrate, on which the ink formulation is coated, is typically light in order for the marking, typically appearing as marking with dark color, to be contrasting and clearly visible. For dark substrate, a light pigment may be included in the ink formulation. The substrate may be transparent. Examples of transparent substrates include plastic films and substrates of glass. Further, the substrate may have low transparency or even be essentially non-transparent. Typical examples of substrates having low transparency or even being essentially non-transparent are substrates of paper or substrates comprising paper, such as packaging laminates. As the marking typically will have a dark color, the lightness (L*) of the substrate should preferably be high in order for the marking to be contrasting to the background and thereby clearly visible. A blackish, a dark brownish, or a dark grayish marking will be clearly visible on a contrasting white or light gray substrate, such as an uncolored or clay coated paper substrate.

Without further elaboration, it is believed that one skilled in the art can, using the preceding description, utilize the present invention to its fullest extent. The preferred specific embodiments described herein are, therefore, to be construed as merely illustrative and not limitative of the remainder of the description in any way whatsoever. Further, although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc do not preclude a plurality.

Experimental

BRIEF DESCRIPTION OF THE DRAWINGS

FIG. 1, schematically illustrates a roll fed filling machine.

The following examples are mere examples and should by no mean be interpreted to limit the scope of the invention. Rather, the invention is limited only by the accompanying claims.

Three marking components of different type, i.e. a TAG/Leuco dye (benzyl p-hydroxybenzoate/ETAC), charrables (fructose//sucrose), and an oxymetal salt (AOM) were chosen for assessing the printing properties of such marking components when overlaid by a polymer layer.

Three ink formulations were thus prepared by premixing the ink components, including water, using a Silverson mixer. The pre-mixed ink was then milled using an Eiger-Torrance bead mill until a Hegman grind gauge particle size reading of less than 5 microns was obtained. The printing properties of the obtained formulations were evaluated. Details regarding the formulations and the experimental details are provided below. In preparing the ink formulations, the following components were used:

r-ITO (90:10 In to Sn by weight) was used in the form of a nanopowder—infra red absorber.

Joncryl LMV7085 (ex. BASF)—styrene-acrylic resin solution binder.

Dispex A40 (ex. BASF)—Solution of an ammonium salt of an acrylic polymer in water-dispering agent.

ETAC (ex. Yamada)—halochromic leuco dye colour former.

Benzyl p-hydroxybenzoate (ex. Sigma-Aldrich)—thermal acid generator.

Glascol LS2 (ex. BASF)—aqueous acrylic binder.

Dispelair CF49 (ex. Blackburn Chemicals)—mineral oil based defoamer.

DEG (ex. Sigma-Aldrich) diethylene glycol-drying retarder.

Tyzor LA (ex. Dupont)—Titanium lactate in an aqueous solution adhesion promoter.

Lucidene 198 (ex. Dow)—aqueous styrene/acrylic emulsion binder.

Thor Acticide MBS (ex. Thor)—water based formulation of 2-methyl-4-isothiazolin-3-one (MIT) and 1,2-benzisothiazolin-3-one—biocide Agitan 350 (ex. Munzing)—blend of modified fatty and alkoxylated compounds, silica, nonionic, surfactant-dispering aid.

Fructose (ex. Aldrich)—charrable sugar

Sucrose (ex. Aldrich)—charrable sugar

Sodium metaborate tetrahydrate (ex. Aldrich)—basic salt.

| Comparative formulation 1 (TAG/Leuco dye) | |
|---|---|
| Joncryl LMV7085 | 28 wt % |
| Water | 21 wt % |
| Dispex A40 | 0.5 wt % |
| r-ITO | 1 wt % |
| ETAC (halochromic leuco dye) | 16.5 wt % |
| Benzyl p-hydroxybenzoate (TAG) | 33 wt % |

The comparative ink formulation 1 was applied to clay coated cardboard using a flexographic printing technique at 10 cm$^3$/m$^2$ Anilox. Subsequently, the coated substrate was subject to melt extrusion lamination at speed of 500 m/min with polyethylene (12 g/m$^2$) at 325° C. The effect of lamination on the background color of the coating was assessed using a Gregtag MacBeth SpectroEye 5000 spectrophotometer (D65, 2°). A color difference (before and after lamination) according to 1976 CIE (L*, a*, b*) space, wherein $\Delta E = \sqrt{(L^*_2-L^*_1)^2+(a^*_2-a^*_1)^2+(b^*_2-b^*_1)^2}$, $\Delta E=16$ was obtained, showing that lamination provided a significant discoloration. The larger $\Delta E$ value the greater the difference in colour between two samples. A $\Delta E<1$, in theory, represents a difference in colour that cannot be noticed by the hypothetical standard observer.

Although a marking with good ODB exceeding 1.0 anyhow could be obtained via imaging using a 5 W, 1550 nm fibre laser (fluence range of 0 to 5 J/cm$^2$ (100% speed)) fitted with a galvo mirror based imaging head, linked to a PC, subsequent to lamination, the discoloration of the coated substrate implies that ink formulations, comprising ETAC (halochromic leuco dye) and benzyl p-hydroxybenzoate (TAG), are no suitable for over lamination.

As the substrate was discolored, the possible laminate puncture damage caused by laser imaging was not assessed.

| Comparative formulation 2 | |
|---|---|
| Water | 19.8 wt % |
| Joncryl LMV 7085 | 24.0 wt % |
| Thor Acticide MBS | 0.2 wt % |
| Dispex A40 | 0.3 wt % |
| Agitan 350 | 0.2 wt % |
| Sucrose | 13.0 wt % |
| Fructose | 5.0 wt % |
| r-ITO | 2.5 wt % |
| Sodium Metaborate tetrahydrate | 35.0 wt % |

The above ink was applied to clay coated cardboard substrate using a flexographic printing technique, i.e. a 14 cm$^3$/m$^2$ Anilox hand flexiproofer. Subsequently, the coated substrate was subject to melt extrusion lamination at speed of 500 m/min with polyethylene (12 g/m$^2$) at 325° C.

The effect of lamination on the background colour of the coating was assessed using a Gregtag MacBeth SpectroEye 5000 spectrophotometer (D65, 2°). A color difference (before and after lamination) according to the 1976 CIE (L*, a*, b*) space, wherein $\Delta E = \sqrt{(L^*_2-L^*_1)^2+(a^*_2-a^*_1)^2+(b^*_2-b^*_1)^2}$, $\Delta E=1.95$ was obtained showing that lamination had a small effect on discolouration.

The laminated substrate was then imaged using a 20 W, 1550 nm galvo driven fibre laser controlled by an IBM compatible pc. A square measuring 1 cm$^2$ was imaged at fluence of 5 Jcm$^{-2}$ and a dark brown image of ODB=0.87 was obtained.

Further, a red ink test was used to determine the presence of laminate puncture damage caused by laser imaging. Thus, red ink was applied by a pipette to the laminated substrates subsequent to imaging. The application did result in visible penetration of the red ink into the paperboard. Further, the possible penetration was assessed using a PIAS II device. Penetration of the ink into the board was seen, confirming that substrates coated with an ink formulation comprising charrables may not be marked without disrupting the outermost protecting polymer layer.

The laminated substrates may also be assessed in accordance to ASTM F1929-98(2004) Standard Test Method for Detecting Seal Leaks in Porous Medical Packaging by Dye Penetration.

| Formulation 1 (AOM) | |
|---|---|
| Glascol LS2 | 13.5 wt % |
| Dispelair CF49 | 1 wt % |
| DEG | 1 wt % |
| Tyzor LA | 1.5 wt % |
| r-ITO | 2.5 wt % |
| Lucidene 198 | 25.5 wt % |
| AOM | 55 wt % |

The ink formulation was applied to a clay coated paper substrate using a flexographic printing technique at 12 cm$^3$/m$^2$ Anilox. Subsequently, the coated substrate was subject to melt extrusion lamination at speed of 500 m/min with polyethylene (12 g/m$^2$) at 325° C. The effect of lamination on the background color of the coating was assessed using a Gregtag MacBeth SpectroEye 5000 spectrophotometer (D65, 2°). A color difference (before and after lamination) of, according to the 1976 CIE (L*, a*, b*) space, wherein $\Delta E=\sqrt{(L*_2-L*_1)^2+(a*_2-a*_1)^2+(b*_2-b*_1)^2}$, $\Delta E=0.69$ was obtained, showing that lamination had a small effect on discoloration, barely noticeable to the human eye, as $\Delta E<1$ is typically not be noticeable to the hypothetical standard observer.

It can thus be deduced that the effect on background whiteness was negligible. In comparison to the discoloration seen with Comparative formulation 1, i.e. >15, this is indeed a truly significant improvement.

Subsequently a 20 W, 1550 nm fibre laser fitted with a galvo mirror based imaging head, linked to a PC, was used to create a marking on the coated/laminated substrate, showing that an ODB exceeding 1.0 (1.43 at fluence of 4.98 J/cm$^2$) could be achieved. Thus, ink formulations comprising AOM and being overlaid by thermoplastic polymer layer, displays good printability.

Further, a red ink test was used to determine the presence of laminate puncture damage caused by laser imaging. Thus, red ink was applied by a pipette to the laminated substrate subsequent to imaging. The application did not result in visible penetration of the red ink into the paperboard. Further, the possible penetration was assessed using a PIAS II device. Penetration of the ink into the board was not seen.

It may thus be concluded that substrates coated with ink formulations comprising AOM may be covered with a thermoplastic polymer layer without discoloring the substrate. Further, the covered ink formulation may be marked without disrupting the outermost protecting polymer layer.

The laminated substrates may also be assessed in accordance to ASTM F1929-98(2004) Standard Test Method for Detecting Seal Leaks in Porous Medical Packaging by Dye Penetration.

Use of a fluence of 4.98 J/cm$^2$, is deemed to cause heating of the ink formulations to temperatures exceeding 350° C. The finding that the polyethylene layer is not disrupted is thus truly surprising.

The invention claimed is:

1. A method for marking a coated substrate coated with an ink formulation having a salt of a transition metal oxyanion, the method comprising:
   irradiating parts of the coated substrate that are covered by a thermoplastic polymer layer where a marking is intended, in order to generate a marking,
   wherein the coated substrate is covered by a thermoplastic polymer layer comprising a polyolefin having a thickness from 10 to 60 µm, by melt extrusion at a temperature ranging from 200 to 340° C., wherein the ink formulation is situated between the substrate and the thermoplastic polymer layer.

2. The method according to claim 1, wherein said ink formulation is coated in a defined pattern and at least parts of the defined pattern are irradiated in order to generate said marking.

3. The method according to claim 1, wherein substrate is irradiated with an irradiation source selected from a group consisting of a laser, a diode, a fiber coupled diode array system, and a diode array system.

4. The method according to claim 3, wherein the irradiation source has an operating wavelength in the range of 780 to 2500 nm.

5. The method according to claim 4, wherein the irradiation source is a Nd:YAG laser or a NIR fiber laser.

6. The method according to claim 1, wherein the thermoplastic polymer layer comprises a polyolefin.

7. The method according to claim 1, wherein coating said substrate is performed by flexographic printing.

8. The method according to claim 1, wherein said ink formulation further comprises a near infra-red absorber.

9. The method according to claim 1, wherein said substrate is comprised of one of paper, cardboard, corrugated paper board, paper board, plastic film, ridged plastic parts, textile, wood, metal, glass, or leather.

10. The method according to claim 1, wherein said ink formulation further comprises one of a binder, a light stabilizing agent, an ink flow/rheology modifier, a drying rate modifier, and/or an adhesion promoters.

11. The method according to claim 1, wherein said ink formulation is water-based.

12. The method according to claim 1, wherein said salt of a transition metal oxyanion is ammonium octamolybdate.

13. The method according to claim 1, wherein the coated substrate is covered by a thermoplastic polymer layer by melt extrusion at a temperature ranging from 280 to 330° C.

14. The method according to claim 1, wherein said ink formulation further comprises a near infrared absorber comprising indium tin oxide.

15. The method according to claim 14, wherein said indium tin oxide is reduced indium tin oxide.

16. A method of making a substrate configured to have a marking, the method comprising:
   coating the substrate with an ink formulation comprising a salt of a transition metal oxyanion to form a coated substrate; and
   covering the coated substrate with a thermoplastic polymer layer, having a thickness ranging from 10 to 60 µm, by melt extrusion at a temperature ranging from 200 to 340° C., wherein the ink formulation is situated between the substrate and the thermoplastic polymer layer,
   wherein at least a portion of the coated substrate is capable of being irradiated to generate the marking.

17. The method according to claim 16, wherein the step of coating the substrate is performed by flexographic printing.

18. The method according to claim 16, wherein the thermoplastic polymer layer comprises a polyolefin.

19. The method of claim 18, wherein the polyolefin comprises polyethylene or polypropylene.

20. The method according to claim 16, wherein the melt extrusion is performed at a temperature ranging from 280 to 330° C.

21. The method according to claim 16, wherein said ink formulation further comprises a near infra-red absorber.

22. The method according to claim 16, wherein said ink formulation further comprises one of a binder, a light stabilizing agent, an ink flow/rheology modifier, a drying rate modifier, and/or an adhesion promoters.

23. The method according to claim 16, wherein said ink formulation is water-based.

24. The method according to claim 16, wherein said substrate is comprised of one of paper, cardboard, corrugated paper board, paper board, plastic film, ridged plastic parts, textile, wood, metal, glass, or leather.

25. The method according to claim 16, wherein said salt of a transition metal oxyanion is ammonium octamolybdate.

* * * * *